United States Patent Office 3,196,669
Patented July 27, 1965

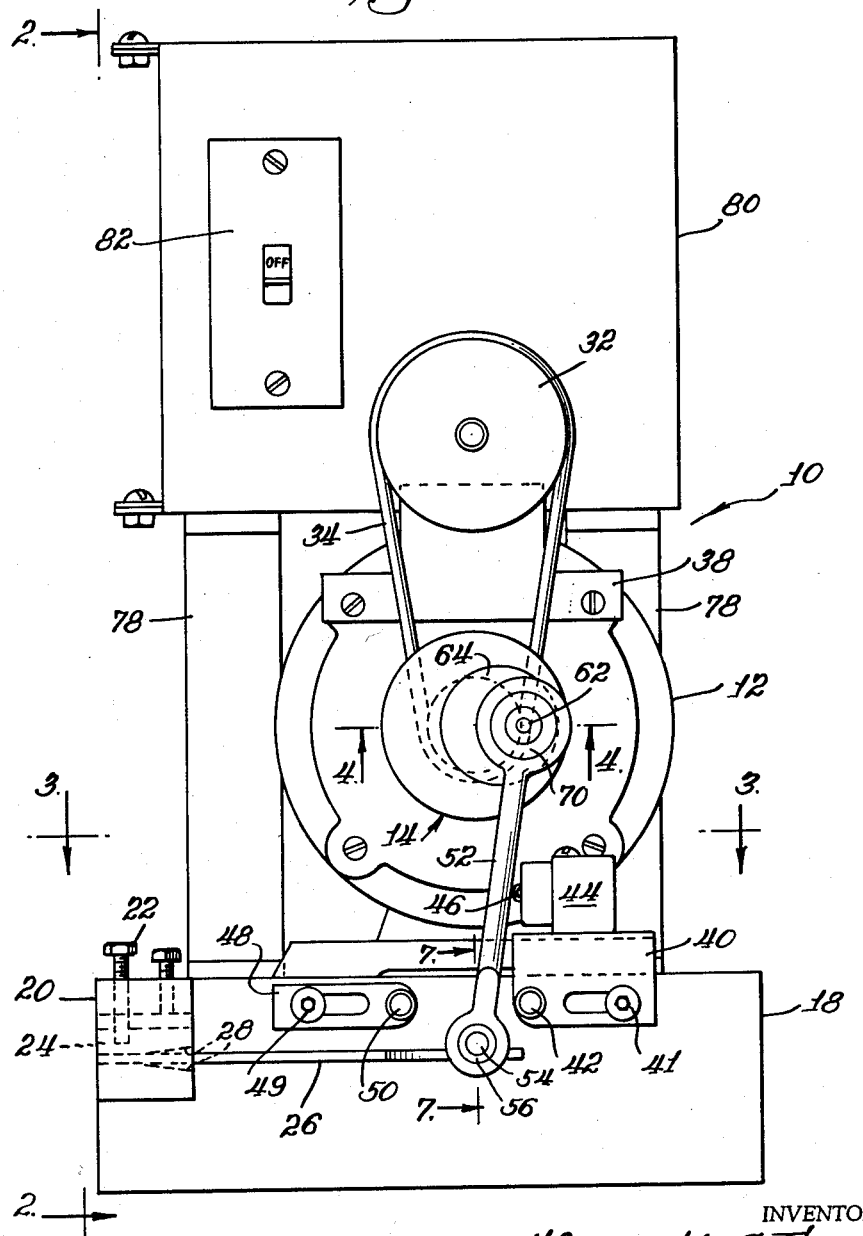

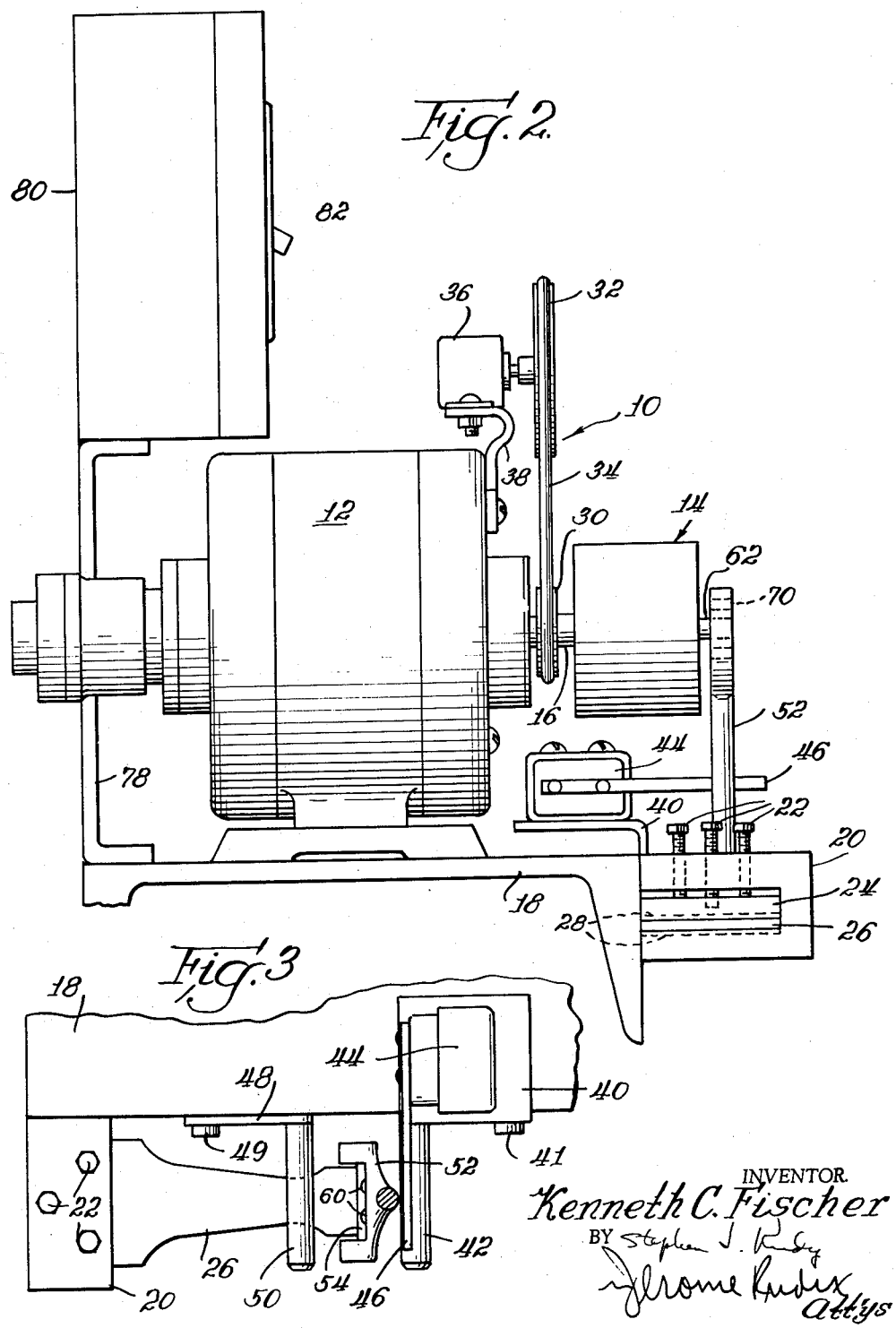

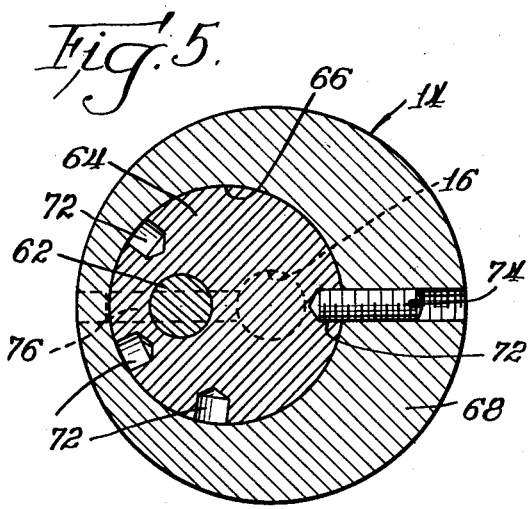
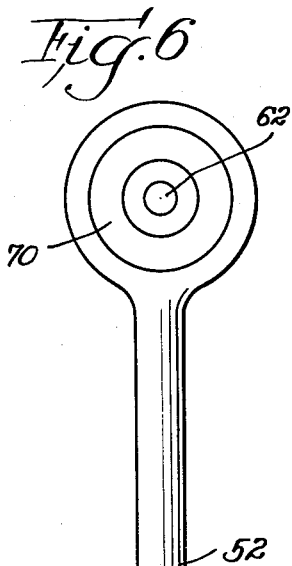
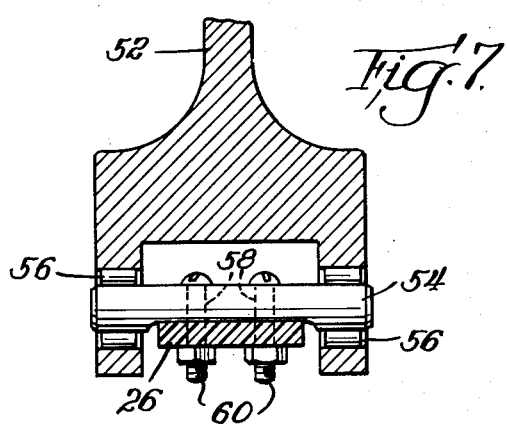
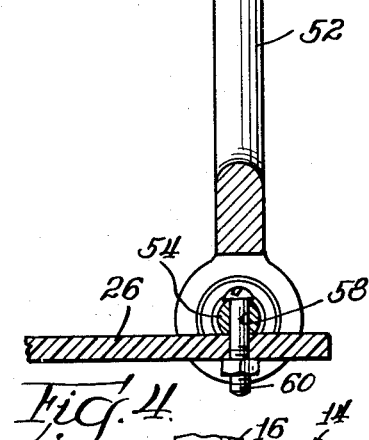
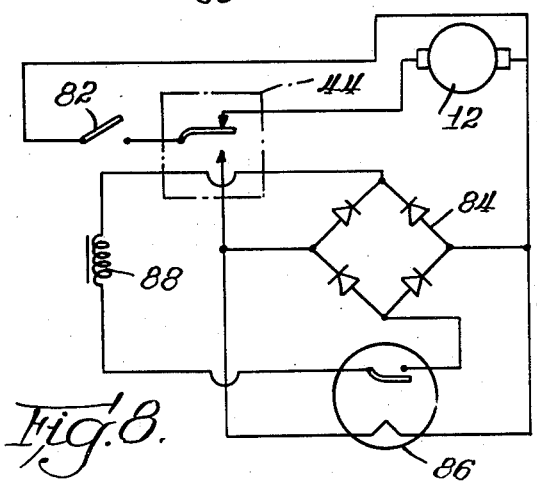
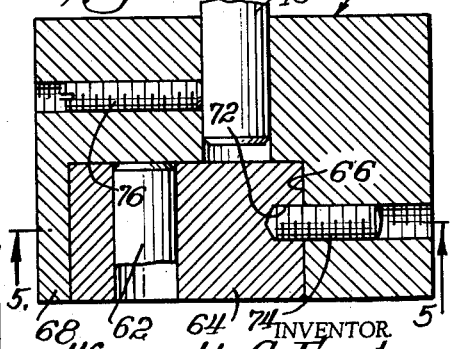

3,196,669
FLEXURE FATIGUE TESTER
Kenneth C. Fischer, Midland, Mich., assignor to The Dow Chemical Company, Midland, Mich., a corporation of Delaware
Filed July 2, 1962, Ser. No. 206,927
5 Claims. (Cl. 73—91)

This invention relates to a machine to test the flexure fatigue limits of samples of plastic materials.

The machine of the invention will be found especially well suited for the testing of certain polymers such as, high impact, compression molded, polystyrene.

While flexure fatigue testing machines are known, those in current use have one or more disadvantages which make them unsuitable for the purpose of the present invention. More particularly, many of such machines have been designed for flexure testing of metals and consequently are more cumbersome and expensive. In addition, such machines generally were not designed to have positive deflection limits, hence, any change in deflection required considerable time and skill on the part of the operator to maintain the same deflection from sample to sample. Such machines also did not provide for immediate stoppage upon rupture of a specimen, and as a result damage was often done to the machine with possible harm to the operator.

The machine of the present invention is of simplified design, and of relatively low construction and maintenance cost. It also features means for providing positive deflection limits and allows easy and accurate adjustment of deflection limits. Among the other features are provision for immediate automatic stoppage upon rupture of the test specimen, thus avoiding damage to the machine and/or physical harm to the operator.

The main object of this invention is to provide a flexure fatigue tester for plastic materials.

A more specific object is to provide a flexure fatigue tester which is of simplified design and of relatively low construction and maintenance cost.

Still another object is to provide a flexure tester having means to assure positive deflection limits, which limits may be easily and accurately adjusted.

A further object is to provide a flexure tester which will stop immediately and automatically upon rupture of a specimen under test, thus avoiding damage to the machine and/or harm to the operator.

These and further objects and features of the invention will become more apparent from the following description and accompanying drawings wherein:

FIG. 1 is a front elevation view of a testing device illustrative of an embodiment of the invention;

FIG. 2 is a side view as seen from line 2—2 in FIG. 1;

FIG. 3 is a view generally as seen from line 3—3 in FIG. 1;

FIG. 4 is an enlarged section view generally as seen along line 4—4 in FIG. 1;

FIG. 5 is a section view generally as seen along line 5—5 in FIG. 4;

FIG. 6 is an elevation view, in partial section, of a flexure arm member and a portion of a specimen under test;

FIG. 7 is an enlarged section view generally as seen along line 7—7 in FIG. 1; and FIG. 8 is a diagram of an electrical circuit used in connection with the device of FIG. 1.

Referring now to the drawings the numeral 10 identifies a flexure fatigue tester which includes a motor 12 having a self-contained brake, such as that known to the trade as a "Bodine type NS 1–33 with Simplatrol brake," and an eccentric drive assembly 14 mounted on the end of motor shaft 16. The motor 12 is supported upon a stand, or frame means 18, to which is affixed a specimen vise, or clamp 20, having three set screws 22 which engage a jaw 24. The latter is arranged for abutment upon the end of a sample, or specimen 26 under test whereby the specimen will be securely clamped in the vise 20. The specimen is designed to have constant outer fiber stress at all points along the straight side portions thereof, thus giving random breaks throughout said portion when the specimen ruptures during test. As best seen in FIG. 1, a slight taper 28 is provided in the surfaces of the jaw 24 and an inner surface of the vise, which allows clearance for a portion of the specimen as it is flexed or vibrated about the end secured in the vise.

A pulley 30 is mounted upon the drive shaft 16 and is connected to another pulley 32 via a belt 34. Pulley 32 is mounted upon a shaft of a revolution counter 36 which is supported by a bracket 38 secured to the motor 12. A horizontally adjustable bracket 40 is affixed to the stand 18, by a bolt 41, which bracket 40 has a rubber covered rod 42 secured thereto and which projects horizontally relative to the front side of the stand. A reset microswitch 44 mounted atop the bracket 40, has an arm 46 which projects in parallel relation to the rod 42. Lateral pressure upon the arm 46 causes operation of the microswitch 44, for the purpose of which will be described hereinafter. A second horizontally adjustable bracket 48 is affixed to the stand 18, by a bolt 49 which bracket 48 has a rubber covered rod 50 in parallel arrangement with the rod 42.

Interconnecting the eccentric drive assembly 14 and the specimen 26, is an elongated member in the form of a connecting rod, or arm 52 which has a bifurcated lower end arranged to support a shaft 54, the ends of which are mounted in roller bearings 56. A pair of holes 58 are formed in the shaft 54 for receipt of fastening means, such as bolts 60, whereby an end of the specimen 26 may be secured to the shaft.

The upper end of the arm 52 is affixed to the eccentric drive assembly 14 which includes a shaft 62 mounted upon an eccentric 64, which is adjustably supported in an offset recess 66 formed in a head 68. A bearing means 70 is arranged in the upper end of the arm 52 for engagement with the shaft 62. A plurality of radially arranged indentations, or recesses 72 (four shown) are formed in the peripheral surface of the eccentric 64 for insertion of the end of a set screw 74 which is mounted in the head 68. In such manner the amount of eccentricity of the shaft 62 relative to the shaft 16 may be adjusted to vary the extent of reciprocal vertical travel of the arm 52, and hence, the degree of flexing of the specimen 26. Attention is directed to the fact that such an arrangement of eccentricity adjustment provides a predetermined sample flexing. The flexing range is positive, and any variation between deflection setting from sample to sample, is thus eliminated. A set screw 76 may be used to secure the eccentric drive assembly 14 to the shaft 16.

It will be noted that when the testing machine 10 is set for a flexure test of a specimen 26, the arm 52 will extend between the stop rods 42 and 50 (FIG. 1). In such manner, uncontrolled and possibly dangerous, or damaging rotation of the arm 52, will be prevented upon breakage, or rupture of the specimen. The vertical travel of the arm 52 is arranged to cause a flexing of the specimen an equal distance on each side of the neutral axis thereof.

Bracket means 78 mounted upon the frame means 18, support a box 80 which contains certain electrical elements including an on-off switch 82. Other elements, as best seen in the circuit diagram of FIG. 8, include a rectifier bridge 84 and a 5-second thermal delay relay 86.

A coil means 88 for use in connection with the motor braking means, is illustrated. It is evident that any person skilled in the art, will have no difficulty in establishing the design criteria for the elements used in the indicated circuit, to accomplish functioning of the device of the invention in the manner intended, as will now be described.

To run a flexure test on a specimen 26, it is placed in the machine in the manner shown, care being taken to see that the arm 52 is clear of engagement with microswitch arm 46, and the motor started, whereupon the specimen will be repeatedly flexed about the end secured in the vise 20. Upon rupture of the specimen the arm 52 will strike the arm 46 breaking the motor circuit and energizing the motor brake means 88 through the delay circuit. The motor is thus immediately stopped, and after a 5-second delay, the delay relay 86 opens the brake circuit whereupon the device is completely deenergized.

For comparative results, it is important that all test specimens be of the same dimension, and testing done in a temperature, as well as humidity, controlled room. It will be found that the number of flexure cycles for failure, will vary between samples, however, if an average of enough samples is taken, the test becomes reproducible. The standard deviation is a measure of precision of the test. It is recommended that at least six specimens should be tested per material sample at each deflection setting.

From the foregoing it will be seen that the machine of the invention will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. A fatigue tester for flexure testing of a plastic specimen, and having means to provide for rupture of said specimen comprising in combination, a motor means, an eccentric drive assembly arranged for rotation by the motor means, an arm pivotally affixed to the eccentric drive assembly and reciprocated thereby, a clamp arranged to hold the test specimen fixed at one end while the other end is engaged by the arm so that reciprocal movement of the arm will cause a flexing of the specimen about each side of a neutral axis of the specimen, and means engageable by the arm comprising a switch which controls said motor means and a switch arm extending adjacent said arm pivotally affixed to said eccentric drive assembly whereby upon rupture of said specimen said switch will be actuated via said switch arm to cause immediate cessation of motor operation.

2. A fatigue tester according to claim 1, wherein a pair of stop rods are arranged on each side of said connecting rod to restrain rotation of said rod upon rupture of a test specimen.

3. The fatigue tester of claim 1 having an electrically operated brake means arranged to stop operation of said motor when said switch means is engaged by the connecting rod.

4. A fatigue tester for flexure testing of a plastic specimen, and having means to provide for rupture of said specimen comprising in combination, a motor means, an eccentric drive assembly arranged for rotation by the motor means, an arm pivotally affixed to the eccentric drive assembly and reciprocated thereby, means to adjust the eccentric drive assembly so that the limit of reciprocal movement of the arm may be varied, a clamp arranged to hold the test specimen fixed at one end while the other end is engaged by the arm so that reciprocal movement of the arm will cause a flexing of the specimen about each side of a neutral axis of the test specimen, and means engageable by the arm comprising a switch which controls said motor means and a switch arm extending adjacent said arm pivotally affixed to said eccentric drive assembly whereby upon rupture of said specimen said switch will be actuated via said switch arm to cause immediate cessation of motor operation.

5. A fatigue tester for flexure testing of a plastic specimen according to claim 4, wherein said eccentric drive assembly includes a head formed to provide an offset recess, an eccentric positioned in said recess, a shaft projecting from said eccentric, said shaft arranged for driving attachment with said connecting rod, and adjustment means to rotationally position said eccentric in said recess.

References Cited by the Examiner

UNITED STATES PATENTS

| | | | |
|---|---|---|---|
| 2,384,411 | 9/45 | Wolford et al. | 73—103 X |
| 2,400,656 | 5/46 | Schesser | 287—52.08 |
| 2,479,989 | 8/49 | Winther | 310—105 |
| 2,500,764 | 3/50 | MacGeorge | 73—100 |
| 2,667,069 | 1/54 | Ramos et al. | 73—100 X |

RICHARD C. QUEISSER, *Primary Examiner.*

JOSEPH P. STRIZAK, *Examiner.*